(12) United States Patent
Zukowski et al.

(10) Patent No.: US 7,673,244 B2
(45) Date of Patent: Mar. 2, 2010

(54) RESPONSIVE ENVIRONMENT SENSOR SYSTEMS WITH DELAYED ACTIVATION

(75) Inventors: Deborra J. Zukowski, Newtown, CT (US); James R. Norris, Jr., Danbury, CT (US); John W. Rojas, Norwalk, CT (US); Shivani Deshpande, Troy, NY (US)

(73) Assignee: Pitney Bowes Inc., Stamford, CT (US)

( * ) Notice: Subject to any disclaimer, the term of this patent is extended or adjusted under 35 U.S.C. 154(b) by 912 days.

(21) Appl. No.: 10/710,293

(22) Filed: Jun. 30, 2004

(65) Prior Publication Data

US 2005/0273715 A1 Dec. 8, 2005

Related U.S. Application Data

(60) Provisional application No. 60/521,613, filed on Jun. 6, 2004, provisional application No. 60/521,747, filed on Jun. 29, 2004.

(51) Int. Cl.
*G06F 3/00* (2006.01)
*G06F 3/48* (2006.01)
*G06F 1/24* (2006.01)

(52) U.S. Cl. .................. 715/744; 715/805; 713/100

(58) Field of Classification Search ............ 715/805, 715/802, 744; 713/100
See application file for complete search history.

(56) References Cited

U.S. PATENT DOCUMENTS

| | | | | |
|---|---|---|---|---|
| 5,493,692 | A * | 2/1996 | Theimer et al. | 455/26.1 |
| 5,603,054 | A * | 2/1997 | Theimer et al. | 710/6 |
| 5,604,487 | A * | 2/1997 | Frymier | 340/5.9 |
| 6,119,186 | A * | 9/2000 | Watts et al. | 710/104 |
| 6,400,996 | B1 * | 6/2002 | Hoffberg et al. | 700/83 |
| 6,944,679 | B2 * | 9/2005 | Parupudi et al. | 709/246 |
| 7,073,129 | B1 * | 7/2006 | Robarts et al. | 715/740 |
| 7,113,130 | B2 | 9/2006 | Zukowski et al. | 342/451 |
| 2002/0065693 | A1 * | 5/2002 | Hattori et al. | 705/7 |
| 2003/0046401 | A1 * | 3/2003 | Abbott et al. | 709/228 |

(Continued)

OTHER PUBLICATIONS

Barkhuus et al., Is Context-Aware Computing Taking Control Away from the User? Three Levels of Interactivity Examined, UbiComp 2003.*

(Continued)

*Primary Examiner*—Tadesse Hailu
*Assistant Examiner*—Nicholas S Ulrich
(74) *Attorney, Agent, or Firm*—George M. Macdonald; Angelo N. Chaclas (57) ABSTRACT

Systems and methods for delayed function activation in a responsive environment are described. A responsive environment includes an intermediary system and notification manager to determine when a responsive environment will launch an application triggered by a sensed event. The environment includes sensor components and transparent software components that reside wholly within the environment for providing responsiveness. The environment also includes interactive software components that give users the means to provide input and/or experience output. Since changes to the interaction components may disrupt the user by requiring the user's attention when it is not convenient, the system helps the user manage the responsive environment by using an application/function delay technique. The environment uses an intelligence and notification mechanism to determine what might be useful and primes the apparatus to provide that functionality. However, the user actually initiates the execution of that function.

15 Claims, 4 Drawing Sheets

U.S. PATENT DOCUMENTS

| | | | |
|---|---|---|---|
| 2003/0182394 A1* | 9/2003 | Ryngler et al. | 709/217 |
| 2003/0236921 A1 | 12/2003 | Cordery et al. | 709/310 |
| 2004/0061716 A1* | 4/2004 | Cheung et al. | 345/710 |
| 2004/0117798 A1* | 6/2004 | Newman et al. | 719/310 |
| 2005/0243019 A1* | 11/2005 | Fuller et al. | 345/1.3 |
| 2005/0273201 A1 | 12/2005 | Zukowski et al. | 700/258 |

OTHER PUBLICATIONS

Sun et al., Towards a Conceptual Model for Context-Aware Adaptive Services, IEEE, 2003.*

Dey, A., et al., A Conceptual Framework and a Toolkit for Supporting the Rapid Prototyping of Context-Aware Applications, Human-Computer Interaction (HCI) Journal, vol. 16 (2-4), 2001, pp. 97-166.

Johanson, B., et al., The Event Heap: a Coordination Infrastructure for Interactive Workspaces, Proc. 4$^{th}$ IEEE Workshop on Mobile Computing Systems and Applications, p. 83, Jun. 20-21, 2002.

Dey, A., et al., Distributed Mediation of Ambiguous Context in Aware Environments, Proc. 15th Annual Symposium on User Interface Software and Technology (UIST 2002), Paris, France, Oct. 28-30, 2002. pp. 121-130.

Ranganathan, A., et al., A Middleware for Context-Aware Agents in Ubiquitous Computing Environments, ACM/IFIP/USENIX International Middleware Conference, 2003, Rio de Janeiro, Brazil, Jun. 16-20, 2003.

Intelligent Pervasive Middleware for Context-Based and Localized Telematics Services, IBM T. J. Watson Research Center, Ford Motor Company-WCM '02, Sep. 28, 2002, Atlanta, Georgia, USA.

A Location Model for Communicating and Processing of Context, TecO, University of Karlsruhe, Karlsruhe, Germany-Springer-Verlag London Ltd. (2002).

Providing Location Information in a Ubiquitous Computing Environment, Mike Spreitzer and Marvin Theimer, Xerox Palo Alto Research Center, SIGOPS 1993.

Distributed File Systems: Concepts and Examples, Eliezer Levy and Abraham Silberschatz, ACM Computing Surveys, vol. 22, No. 4, Dec. 1990.

The ToolFinger: Supporting Complex Direct Manipulation in Virtual Environments, Gerold Wesche, The Eurographics Association, 2003.

* cited by examiner

RESPONSIVE ENVIRONMENT SENSOR SYSTEMS WITH DELAYED ACTIVATION

CROSS REFERENCE TO RELATED APPLICATIONS

This application claims priority under 35 U.S.C. section 119(e) from Provisional Patent Application Ser. No. 60/521,613, filed Jun. 6, 2004, entitled Responsive Environment Sensor Systems With Delayed Activation, which is incorporated herein by reference in its entirety. This application claims priority under 35 U.S.C. section 119(e) from Provisional Patent Application Ser. No. 60/521,747, filed Jun. 29, 2004, entitled Responsive Environment), which is incorporated herein by reference in its entirety.

BACKGROUND OF INVENTION

The illustrative embodiments described in the present application are useful in systems including those for use in responsive environments and more particularly are useful in systems including those for application and function activation in a responsive environment.

The term responsive environment may be used to describe an environment that has computing capability and access to sensing technology data that allows the environment control to consider its current state or context and new events that occur that may change the state or context.

Some examples of prototype responsive environments include the BlueSpace system described by IBM Corporation of White Plains, N.Y., the Stanford Iroom system described by Stanford University of Stanford, Calif. and the Aware Home system described by Georgia Institute of Technology of Atlanta, Ga.

Two types of responsiveness are traditionally supported in responsive environments. In the first type, an application currently running in the environment receives an event message including sensed data. The application then performs a function that is determined by the sensed data that represents the sensed event. For example, an environment management application may be running in an office. The application may be programmed to set the lights, temperature, and white noise level of the office when a person enters it by using information regarding the identity of the person and the time that the person entered the office. In this example, the sensed event is that someone entered the office and it includes the identity of the entering person.

In a second type of responsiveness, environment functionality may be enhanced based on sensed events. Certain applications that were not previously running could be dynamically started in response to a sensed event. Alternatively, certain applications that were running could be terminated due to a sensed event. For example, a meeting room may automatically launch a presentation application to support a meeting that is about to begin when the presenter enters the room.

Several groups have described systems related to responsive environments and context aware computing. In a first example, a project named the Context Toolkit is described in relation to the Aware Home system in a paper entitled "A Conceptual Framework and a Toolkit for Supporting the Rapid Prototyping of Context-Aware Applications" by Anind K. Dey, Daniel Salber and Gregory D. Abowd as found in the Human-Computer Interaction (HCI) Journal, Volume 16 (2-4), 2001, pp. 97-166.

In a second and third example, the Iroom system is described. In the second example, a group described the Event Heap system in a paper entitled "The Event Heap: A Coordination Infrastructure for Interactive Workspaces" by Brad Johanson and Armando Fox as found in the Proceedings of the Fourth IEEE Workshop on Mobile Computing Systems and Applications, p. 83, Jun. 20-21, 2002.

In the third example, a mechanism to introduce mediation into decisions initiated by a responsive environment is described in a paper entitled "Distributed Mediation of Ambiguous Context in Aware Environments" by Anind K. Dey, Jennifer Mankoff, Gregory D. Abowd and Scott Carter as found in the Proceedings of the 15th Annual Symposium on User Interface Software and Technology (UIST 2002), Paris, France, Oct. 28-30, 2002. pp. 121-130.

The first two examples describe mechanisms for building responsive environments. In the first example, applications within an environment are made responsive by directly building in their reactions to sensed events during the design of the application. In the second example, sensed events are all published to a well-known space, so that applications can access them easily at run time. Accordingly, those applications can be responsive to those events. For both the first and second examples, the application designers specifically build in responsiveness. The applications execute this responsiveness directly in a predetermined fashion, whether or not the user wants it.

The system described in the third example apparently provides an attempt at mediation to better handle errors of decisions that the environment may make. It introduces special mediation components that, given that the environment is responding, can reduce the error in the decision that the environment makes. For example, an application in the environment may try to support the user with word completion such that the system guesses the rest of a word being typed after only a few letters are typed. Given the context, the environment may complete words differently. The mediation components allow users to more specifically say what the relevant context is, so that the decisions made by the applications are more supportive. However, the mechanism does not allow the user to control when the environment initiates the decision process. Rather, it assumes that the response will happen and the system merely allows the user to mediate the response to provide better decisions.

Traditional responsive environments are very much hardwired. That is, a sensor is tied to an application, and when it senses an event, it immediately affects the behavior of that application in a predetermined way. There is little or no opportunity for user interaction in this type of system. In most cases, the level of functionality is pre-set and new applications are not typically launched.

However, in those traditional responsive environments that are able to launch other applications, they do so directly and immediately based on predetermined sensed events. Users might be able to initially configure which event causes which application to startup, but when the event happens, the designated application starts automatically.

Accordingly, among other things, the prior art does not provide a responsive environment having delayed application and/or function activation.

SUMMARY OF INVENTION

The illustrative embodiments described herein overcome the disadvantages of the prior art by providing a method and system for delayed function activation in a responsive environment. In one illustrative embodiment, a responsive environment includes a notification manager intermediary system used to determine when a responsive environment will launch an application triggered by a sensed event. The environment includes sensor components and transparent software components that reside wholly within the environment for providing responsiveness. The environment also includes interactive software components that give users the means to provide input and/or experience output.

The transparent components build dynamic context within the environment, determine if the environment context has changed, and if the context has changed, cause the environment to respond. Such response may include initiating a functional and/or content change in an active interactive component. Additionally, the response may include starting and/or stopping one or more components or applications. Since changes to the interaction components may disrupt the user by requiring the user's attention when it is not convenient, the system helps the user manage the responsive environment by using an application/function delay technique.

The environment uses intelligence to determine what might be useful and primes the apparatus to provide that functionality. However, the user actually initiates the execution of that function. The system utilizes a notification mechanism along with the primed apparatus as the means to trigger the function.

DETAILED DESCRIPTION

Illustrative embodiments describing systems and methods for responsive environments having delayed application and/or function activation are described. The illustrative embodiments are described with reference to particular representative configurations, sensors and data types, but systems according to the present application may use varied and variable configurations, sensor types and data and functionality types.

Several disadvantages of traditional responsive environments exist. Users may feel that responsive environments are just too responsive. The occupants of a room may want more fine-grained control. For example, the occupant may want the lights dimmed, but not quite yet. The occupant might want the presentation software to start, but not until after introductions have occurred.

Context is defined to comprise information and in at least some embodiments includes two sets of information. The first set of information includes statistically registered entities of interest, each with a predefined set of characteristics. Entities of interest include people, devices, applications, sensors, spaces, tasks and documents. Characteristics are based upon the type of entity. For example, document characteristics may include among other things a title and a date of creation. The characteristics of people may include for example a full name and a nickname. The second set of information includes dynamic relationships between (among) the entities of interest. For example, a person is using a projector and a document is present in the room. In that situation, there are at least two types of relationships to illustrate. There is a relationship between the people and devices and there is a relationship between the documents and the spaces.

Many people do not like notifications or windows suddenly popping up on their computer display screens while they are working with a particular application such as a word processor. Such interruptions disrupt their work. Accordingly a system was needed that could have the environment support the user's work and at the same time reduce its intrusiveness.

The illustrative embodiments of the present application provide several advantages over prior systems. First, the embodiments describe responsive environments that manage the context and that can use that context intelligently to support the users of the environment. Traditional systems focused instead on having the application react to the environment. Secondly, the embodiments describe responsive environments in which users have control over when and how the recommended function is done. Thirdly, the embodiments describe responsive environments in which user attention is better managed. For example, the responsive environment does not force a user to do things on a particular predetermined timetable. Instead, the user can do things when it is convenient. Additional advantages will be apparent as the embodiments are described.

Accordingly, the illustrative embodiments described focus on a method and supporting apparatus for enhancing the functionality of a responsive environment that gives users control over the two traditionally supported types of responsiveness described above using a single mechanism. Furthermore, the embodiments described provide this control selectively such that the method and apparatus is non-disruptive to the existing environment. Accordingly, the systems described may co-exist with the traditional systems that support responsiveness. The illustrative embodiments leverage the available intelligence of the responsive environment to determine the range of behaviors a user may want to happen, given the context of the environment. However, the embodiments described also provide a mechanism to delay the responsiveness in a way that allows the user to have more control. In addition, the systems do so in a way that is not intrusive to the user.

In one embodiment, a responsive environment is instrumented with sensors, transparent software components that reside wholly within the environment for providing responsiveness, and interactive software components that give users the means to provide input and/or experience output. The sensor components provide sensor data. The transparent components build dynamic context within the environment, determine if the environment context has changed, and if the context has changed, cause the environment to respond, often by initiating a functional/content change in an active interactive component or by starting and/or stopping one or more components. Changes to the interaction components may disrupt the user, requiring his/her attention when not available. In this embodiment, the system helps the user manage his/her attention within a responsive environment by using an application/function delay technique. The environment uses it's intelligence to determine what might be useful and primes the apparatus to provide that functionality, but the user is the one to actually initiate the execution of that function. The invention uses a specialized notification mechanism, tied to the primed apparatus, as the means to trigger the function.

Figure 1:
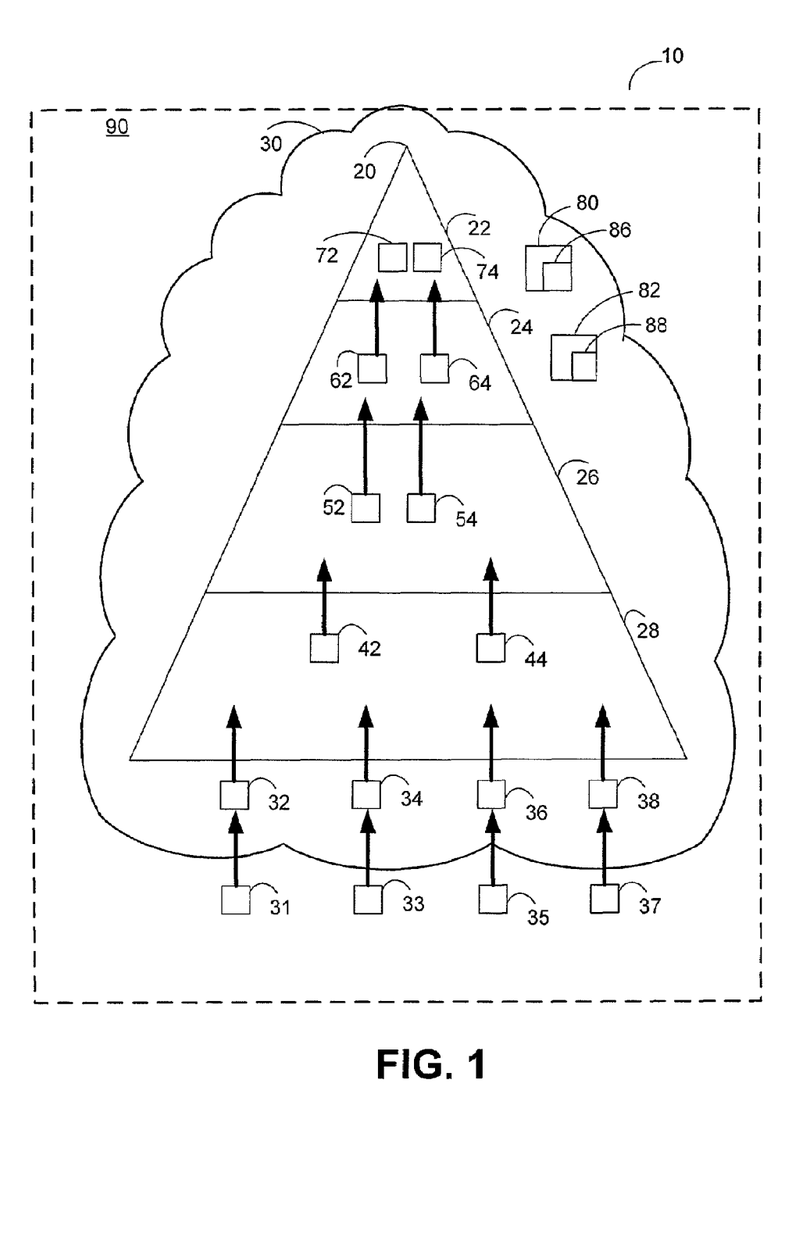
FIG. 1 is a schematic representation of a representative responsive environment according to an illustrative embodiment of the present application.

Referring to FIG. 1, an illustrative responsive environment 10 according to an illustrative embodiment of the present application is shown. The representative responsive environment has been implemented in a system known as Atira that includes a context management infrastructure that includes a layered framework of incremental intelligence in the form of a PAUR pyramid 20 that has four layers each including components that have similar overall roles. The components pass messages up to the layer above. However, different components in a particular layer may provide specialized functionality by subscribing to a subset of messages from the layer below.

External stimuli are sensed using physical or logical sensors 31, 33, 35 and 37. The stimuli enter the pyramid 2 through sensor/trigger components 32, 34, 36, 38 that interact directly with the sensors. Those triggers typically only publish into the pyramid rather than subscribe to messages. The lowest layer of the pyramid is the P or Perception layer 28 and it includes several perception components 42, 44. The perception components may subscribe to stimuli events. Similarly, the perception components may publish to the next higher level. The Perceptors are used to filter the types of external stimuli that are used to build the context.

The next level of the pyramid 20 is the A—Awareness layer 26. The awareness layer components 52, 54 are known as Monitors. The monitors manage the state of active entities that are known in the context such as document, application or task entities. The monitors 52, 54 manage the overall state of the environment by updating properties associated with entities. They determine the occurrence of activities such as a person carrying a particular document that may also indicate an additional change in state. They also manage the relationships among the entities.

The next level of the pyramid 20 is the U—Understanding layer 24. The understanding layer components 62, 64 are known as Grokkers. The grokkers determine the types of activities that are underway in the environment. The grokkers determine if changes in the context merit a change in behavior in the room, and if so, determines the type of behavior and initiates it. Grokkers are also utilized to prime applications.

The final level of the pyramid 20 is the R—Response layer 22. The response layer components 72, 74 are known as Responders. The responders semantically drive the environment function and prepare and deliver an announcement that describes the needed behavior. The applications in the environment use the announcements to decide if any function is needed.

The responsive environment 10 includes thin client applications that reside outside of the context infrastructure 30. For example, an interface browser application 80 may be used to view objects in the environment. Additionally, an application launcher client 82 may be used to launch external applications based upon the context contained in the PAUR pyramid 20. A Notification Manager can be a thin client application with an interactive component that manages the user's attention. For example, the thin clients 80, 82 include actuators 86 and 88 that are part of the thin client systems. The actuators and thin clients may subscribe to announcements of the system and can also include triggers to create internal stimuli such as an application-entered environment.

The illustrative responsive environment system described utilizes a central server computing system comprising one or more DELL® servers having an INTEL® PENTIUM® processor running the WINDOWS® XP operating system. The system is programmed using the JBOSS system and the Java Messaging System (JMS) provides the publish/subscribe messaging system used in the responsive environment.

In an illustrative embodiment, physical sensor 31 is a scanner system that also includes a computer that interfaces with the sensor component 32 using a serial line or TCP/IP interface. The connections among the physical systems that comprise the logical system 90 include wireless and wired connections among physical computers running the appropriate applications, components and frameworks. Sensors 35, 37 are RFID sensors each including a computer that interfaces with the respective sensor components using a serial line. Sensor 33 may comprise well-known sensors such as thermometers, pressure sensors, odor sensors, noise sensors, motion sensors, light sensors, passive infrared sensors and other well-known sensors. Additional well-known communications channels may also be used. In the illustrative embodiment described, the JBOSS JMS message space is running on one server while the MySQL system is run using another server to maintain tables used in the RDF system. Additionally, the PAUR components such as component 42 are all running on a third server. The thin clients 80, 82 and thin client components 86, 88 are running on separate client machines in communication with the system 90.

The responsive environment described herein is illustrative and other systems may also be used. For example, a querying infrastructure could be used in place of the notification or publish/subscribe system that is described above. Similarly, the messaging service could be provided across systems and even across diverse system architectures using appropriate translators. While INTEL® processor based systems are described using MICROSOFT® WINDOWS systems, other processors and operating systems such as those available from Sun Microsystems may be utilized.

Figure 2:
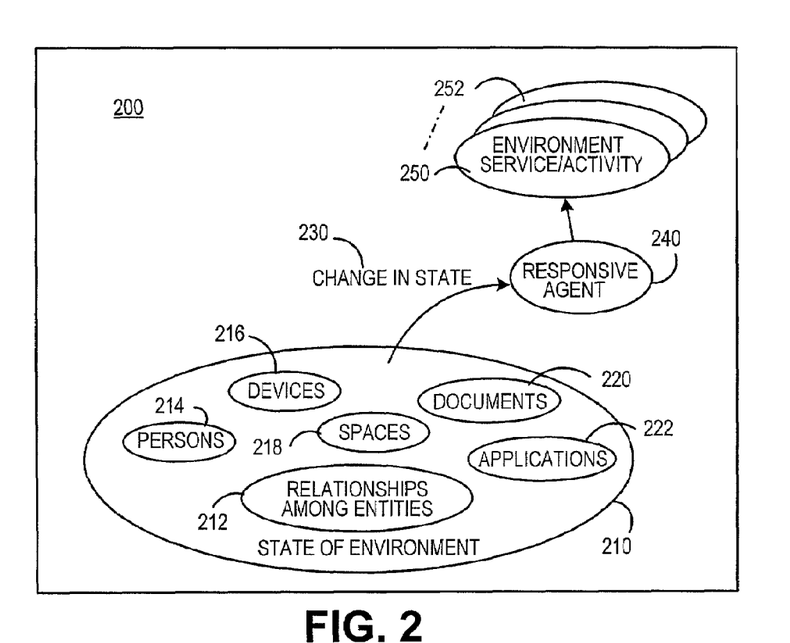
FIG. 2 is a schematic representation of the response to a change of state of a representative responsive environment according to an illustrative embodiment of the present application.

Referring to FIG. 2, the response to a change of state of a representative responsive environment 200 according to an illustrative embodiment of the present application is shown.

Responsive environments typically include systems for managing the state of the environment, sensing events that may change that state and driving responses to the change in state. In this embodiment, the state is represented using a series of models. The models include a set of entity models and a model that contains relationships among the entities as shown in FIG. 2. All of the models shown in this embodiment are described using Resource Description Framework (RDF) descriptions and are persisted using a relational database. The Jena system available from the Hewlett-Packard Company of Palo Alto, Calif. is used as an RDF manager, but the OWL ontology being standardized by the World Wide Web consortium may also be utilized.

The environment 200 supports several different types of entities, as shown by the plurality of representative entity models in the state of the environment 210. All of the entities are uniquely identified using a Uniform Resource Indicator (URI). These entities may include persons 214, devices 216, spaces 218, documents 220, and applications 222. Additionally, a model for the relationships among the entities is maintained 212. Furthermore, task entities may be maintained.

When a change in state 230 occurs, a message or event is generated and posted to the environment. The environment 200 includes special components named Responsive Agents 240 that receive the messages or events that correspond to the grokkers. The responsive agent 240 then determines the types of function and/or activities that the environment should perform as a result of that change in state. The responsive agent 240 then communicates directly with the affected Environment Services 250, 252 to have the service carry out the function.

Figure 3:
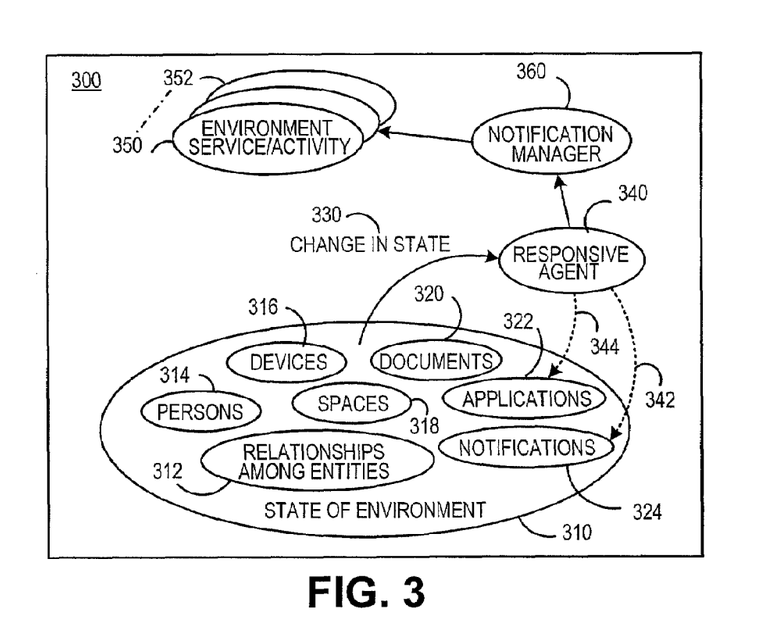
FIG. 3 is a schematic representation of the response to a change of state of another representative responsive environment according to an illustrative embodiment of the present application.

Referring to FIG. 3, the response to a change of state of a representative responsive environment 300 according to an illustrative embodiment of the present application is shown.

In this embodiment, an intermediary named the Notification Manager 360 is provided. Additionally, the state of the environment 310 models also includes a Notification Model 324. The environment 300 also supports several different types of entities that are also uniquely identified using a Uniform Resource Indicator (URI). These entities may include persons 314, devices 316, spaces 318, documents 320, and applications 322. Additionally, a model for the relationships among the entities is maintained 312.

When a change in state 330 occurs in this embodiment, the Responsive Agent 340 determines the type of function/activity that the environment should provide in response to that change. However, rather than communicating directly with the Environment Service and Activity components 350, 352, the Agent 340 first defines descriptions 344 for the needed application instances in the application model 322 and stores the needed inputs in that description. The Agent 340 then creates a new notification 342, defines its description in the notification model 324, associating the newly created application instance descriptions within the notification description. It then passes the notification to the Notification Manager 360.

Figure 4:
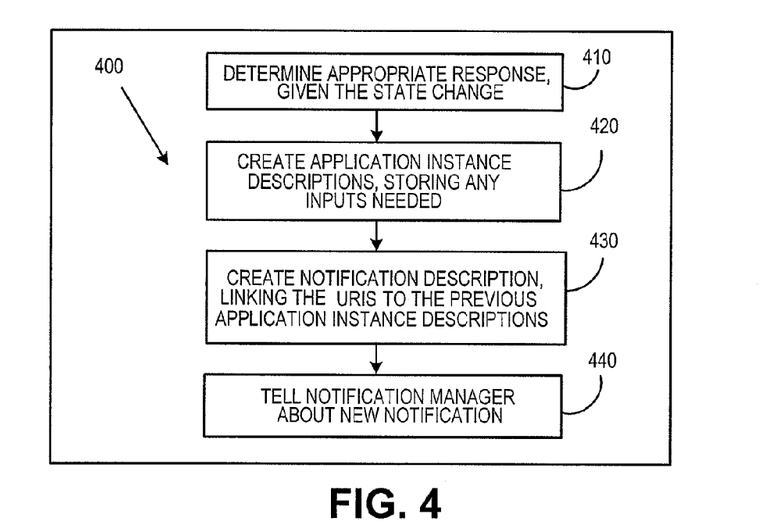
FIG. 4 is a flowchart showing a representative method for using a notification manager system according to an illustrative embodiment of the present application.

Referring to FIG. 4, a flowchart describing a representative process 400 for using a notification manager system according to an illustrative embodiment of the present application is shown.

Initially, in step 410, the process determines the appropriate response, given the state change. In step 420, the process creates application instance descriptions, storing any inputs needed to actually instantiate the application. In step 430, the process creates a notification description linking the URIs to the previously created application instance descriptions. Finally, in step 440, the process informs the notification manager of the new notification.

Here, the application instance description includes a link to a description in the application model that describes the type of application that should be started. When the appropriate response includes augmenting the environment with a new application service/activity, the linked application instance description describes that service/activity. When the response is to have an existing application service/activity execute function, the linked application instance is a special mediator application that allows the user to customize parameters for that function and that then communicates with the targeted service/activity to initiate the function.

Figure 5:
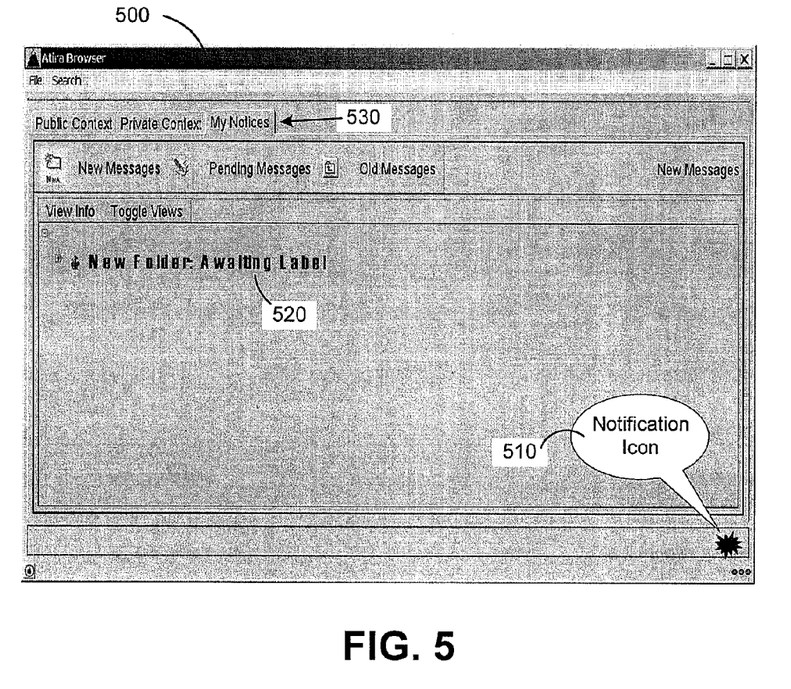
FIG. 5 is a schematic representation of a representative notification interface browser used with a responsive environment according to an illustrative embodiment of the present application.

Referring to FIG. 5, a representative notification interface browser 500 used with a responsive environment according to an illustrative embodiment of the present application is shown.

The Notification Manager is implemented with the environment browser application 80. The environment browser 500 provides users of the environment a way of viewing private and public context within the environment such as the presence of a new folder 520 that is awaiting a label input from the user. Accordingly, it also provides an excellent place to send notification messages.

The notifications of the illustrative embodiment described here utilize a traditional email mechanism. However, other known notification systems may be used. If a new notification is received, then a non-intrusive icon 510 is shown at the bottom of the window. The user can browse to view the notifications, as listed on the My Notices panel 530, at his/her own convenience.

Figure 6:
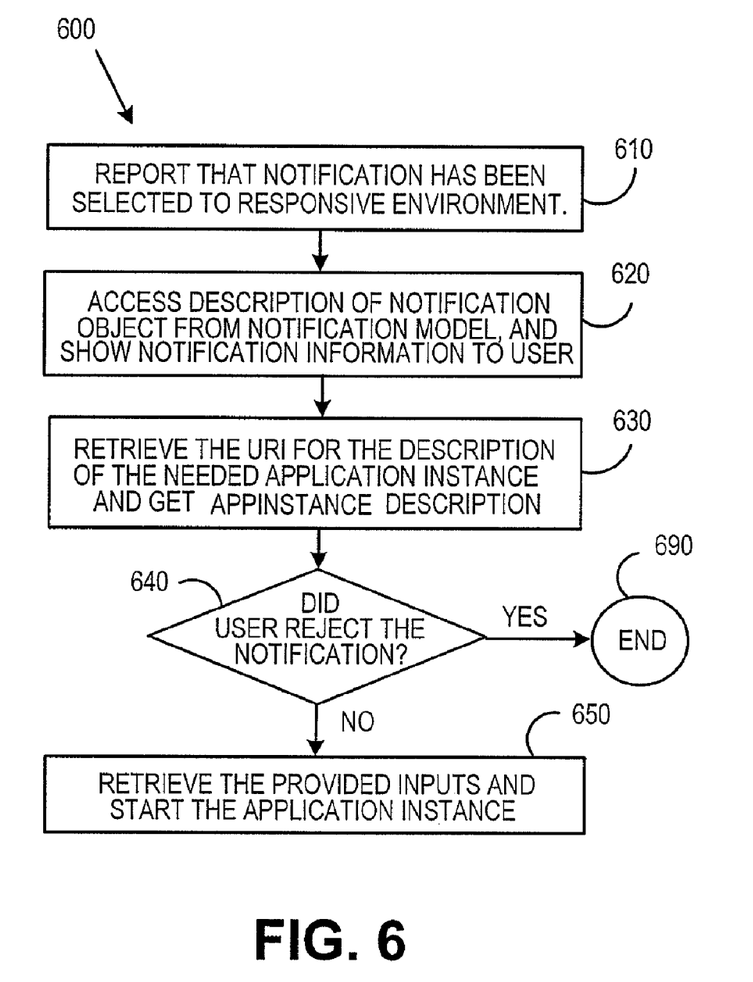
FIG. 6 is a flowchart showing a representative method for using a notification manager system according to an illustrative embodiment of the present application.

Referring to FIG. 6, a flowchart describing a representative process 600 for using a notification manager system according to an illustrative embodiment of the present application is shown.

When the user selects a notification in the panel, the following steps occur. In step 610, the Notification Manager reports to the environment that the user has selected the notification since that action may cause the environment to change context and thus behavior. For example, the initiator of the initial message may have requested to be notified when the recipient clearly received the message.

In step 620, the Notification Manager then accesses the description for the selected notification object from the notification model. The process also displays the notification information to the user.

In step 630, the system retrieves the URI for the application instance that it needs to start, and uses that to retrieve the description of the application instance.

If the environment browser is not currently active a notification icon is sent to the user's task bar. The taskbar icon opens the environment browser application and the user can then access notifications as described above.

In step 640, the system displays information about the notification to the user and application parameters and queries the user to allow the user the opportunity to reject it. By rejecting it, any enhanced functionality will not occur and the process will end in step 690. Note that instead of rejecting the notification, the user may modify some of the application parameters, if desired. Additionally, the user may decide to further delay the function. The acceptance or rejection may be implicit by allowing a timer to time out or may be explicit by having the user perform a selection operation.

In step 650, if the notification has not been rejected, the manager starts the application, using the parameters as modified by the user.

The illustrative embodiments described herein provide a common apparatus for delaying responsiveness within a responsive environment until a user has the desire to allow the responsiveness or until the user has the time to control/modify some aspect of the responsiveness.

If the responsive environment determines that new applications should be launched, the new applications will be launched as soon as the user actively acknowledges/accepts the associated notification. If the responsive environment determines that an existing application should change behavior, the application started by the apparatus is a mediator that the user can use to modify/customize the response.

This systems described may coexist with traditional systems that employ only automatic responsive functionally. The Responsive Agents may leverage the new functionality or may execute in a more traditional manner.

Co-pending, commonly owned U.S. patent application Ser. No. 10/176,248, filed Jun. 19, 2002, is entitled Method and system for creation and use of webs of linked documents and is incorporated herein by reference in its entirety.

Co-pending, commonly owned U.S. patent application Ser. No. 10/710,294, filed on Jun. 30, 2004, is entitled Method and System For Determining Location By Implication and is incorporated herein by reference in its entirety.

Co-pending, commonly owned U.S. patent application Ser. No. 10/710,295, filed on Jun. 30, 2004, is entitled Method and System For Deployment of Sensors and is incorporated herein by reference in its entirety.

The present application describes illustrative embodiments of a system and method for delayed function activation in a responsive environment. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for processing a change of state to update from a first environment state to a second environment state in a responsive environment comprising:
   determining a type of response that the environment should provide in response to the change of state to reach the second environment state;
   defining response descriptions for the needed response instance having needed inputs in an application model;
   storing the needed inputs in the response description;
   creating a new notification;
   defining a new notification description in a notification model;
   associating the response descriptions within the new notification description; and
   then providing the new notification to a notification manager, wherein the notification manager is configured to receive a plurality of new notifications for a user received over time and to receive at least one response to the plurality of the new notifications from the user at the convenience of the user,
   then continuing processing in the first environment state until the at least one user response is received from the user, wherein the at least one user response includes revised needed inputs; and
   launching an application using the revised needed inputs when the user accepts the notification.

2. The method of claim 1, wherein:
   the response comprises launching an application and effecting a further change of state comprising sending a notification associated with the response.

3. The method of claim 1, further comprising:
   determining if the response includes an immediate response event; and
   if the response includes an immediate response event, initiating the immediate response event before providing the new notification to the notification manager.

4. A method for processing a response notification selection from a user to update from a first environment state in a responsive environment comprising:
   reporting to the responsive environment that the response notification has been selected;
   accessing the description for a notification object corresponding to the selection from a notification model;
   retrieving a Uniform Resource Indicator (URI) for a corresponding application;
   retrieving a description of the application;
   displaying information about the notification and application parameters to the user;
   querying the user to allow the user the opportunity to respond to accept or reject the notification from a list including a plurality of notifications received over time and continuing processing in the first environment state until the user responds, wherein the user response includes revised needed inputs; and
   launching the corresponding application using the revised needed inputs when the user accepts the notification.

5. The method of claim 4, wherein:
   reporting to the responsive environment that the user has selected a response notification comprises:
   notifying an initiator.

6. The method of claim 4, further comprising:
   terminating processing of the response notification if the user rejects the response notification.

7. The method of claim 6, wherein:
   terminating processing comprises terminating an application.

8. The method of claim 4, further comprising:
   querying the user to allow the user the opportunity to explicitly accept the notification.

9. The method of claim 8, further comprising:
   if the notification is accepted, launching the application using the application parameters.

10. The method of claim 8, further comprising:
    querying the user to allow the user the opportunity to accept the notification and to provide input to change the application parameters.

11. The method of claim 10, further comprising:
    if the user provides input to change the application parameters, creating new application parameters based upon user input.

12. The method of claim 11, further comprising:
    launching the application using the new application parameters.

13. The method of claim 8, further comprising:
    processing a default implicit answer to the query using a timer wherein expiration of a time out count results in a selection of the default implicit answer.

14. The method of claim 8, further comprising:
    permitting the user to further delay accepting or rejecting the notification.

15. The method of claim 1, wherein:
    providing the new notification to a notification manager comprises displaying a non-intrusive icon in a window.

* * * * *